Aug. 28, 1945. C. J. WERNER 2,383,901
POWER TRANSMITTING DEVICE
Filed Dec. 10, 1942 3 Sheets-Sheet 3

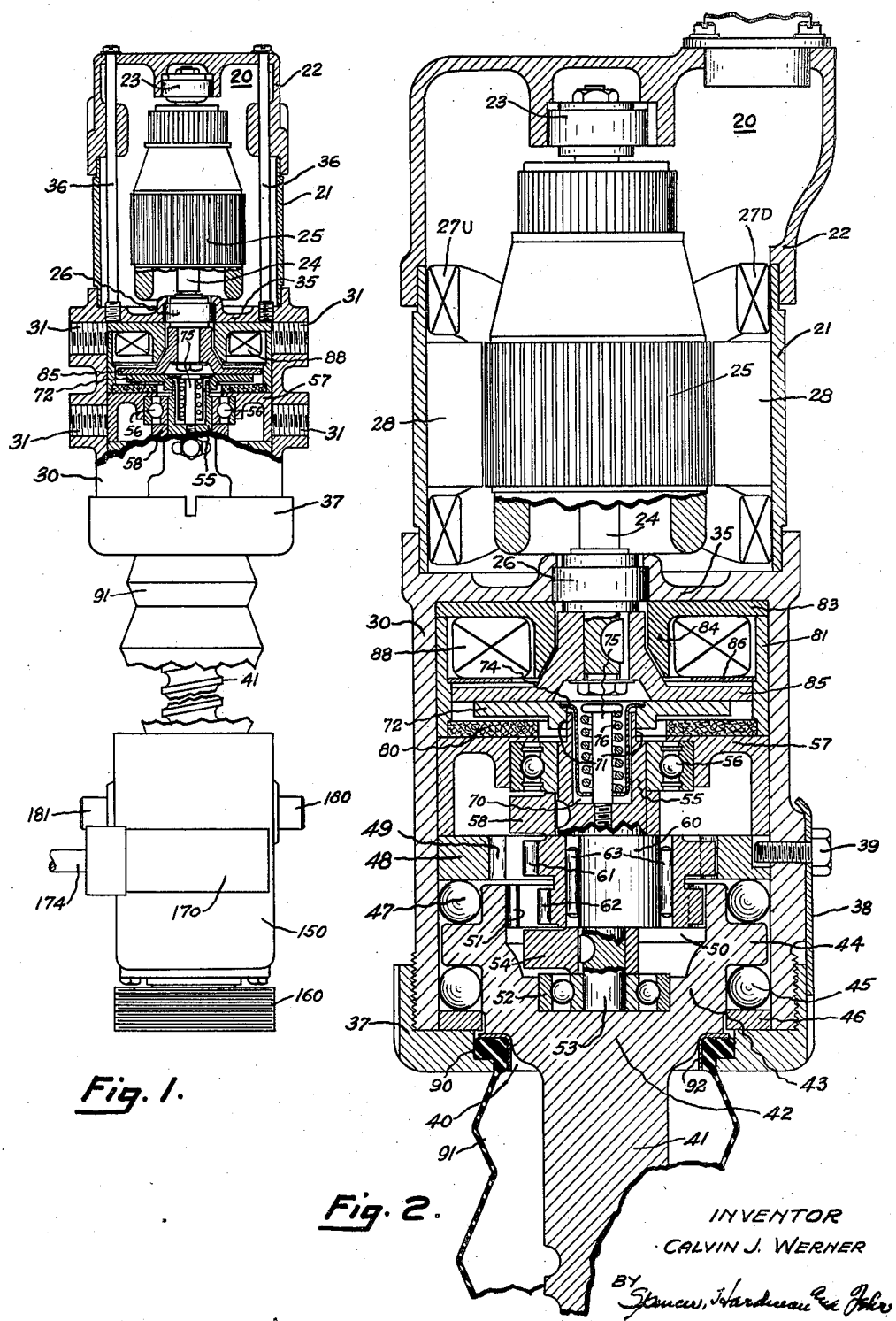

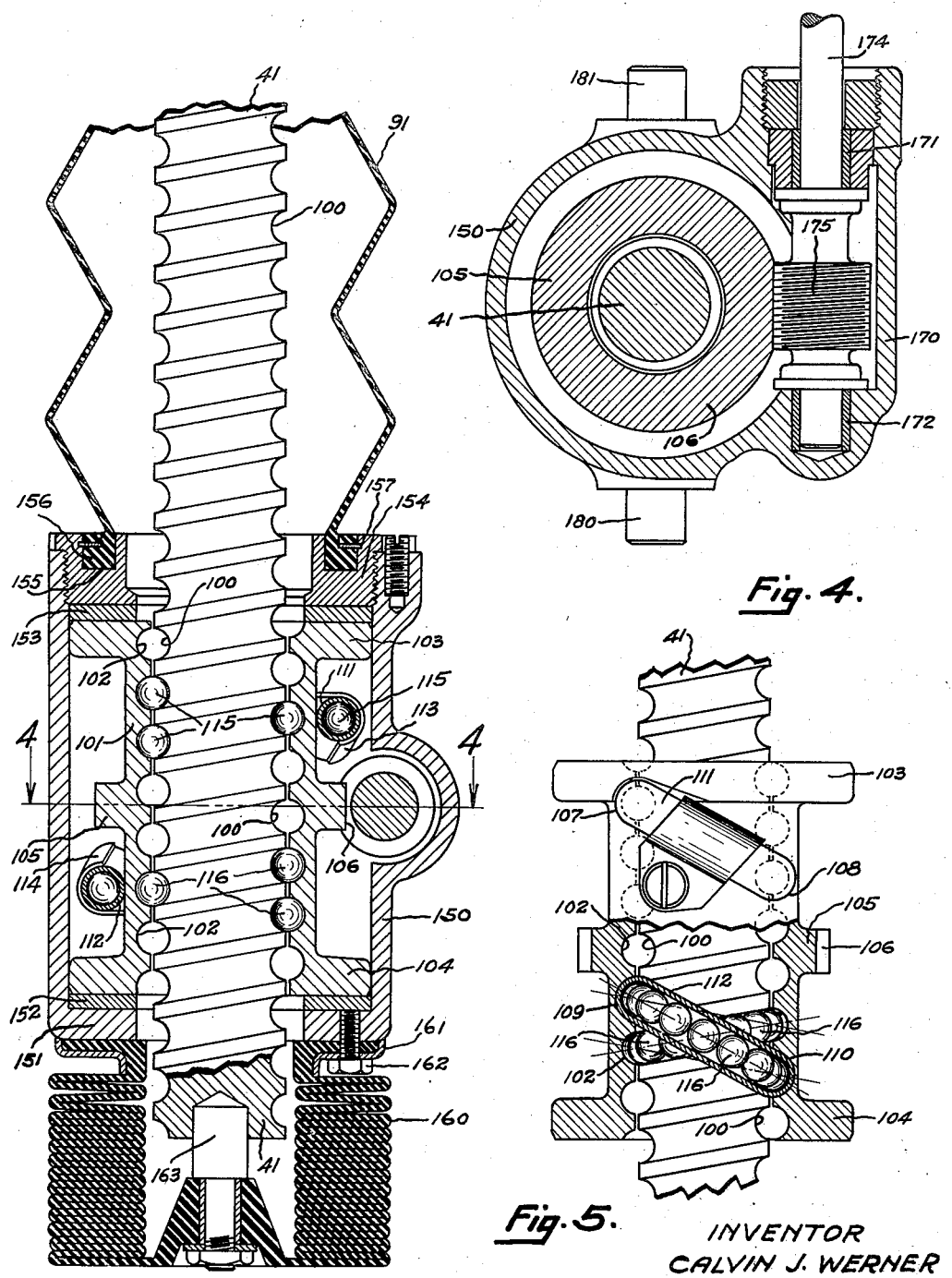

INVENTOR
CALVIN J. WERNER
HIS ATTORNEYS.

Patented Aug. 28, 1945

2,383,901

UNITED STATES PATENT OFFICE 2,383,901

POWER TRANSMITTING DEVICE

Calvin J. Werner, Dayton, Ohio, assignor to General Motors Corporation, Detroit, Mich., a corporation of Delaware Application December 10, 1942, Serial No. 468,475

14 Claims. (Cl. 74—407)

This invention relates to improvements in load supporting devices such as jacks or the like and which are adapted to exert a pushing or pulling effort as the device is extended or retracted.

It is among the objects of the present invention to provide a unitary power driven load supporting device of compact and sturdy construction capable of exerting a powerful, smooth and steady pushing or pulling effort as the device is actuated in one direction or the other to move the load.

A further object of the present invention is to provide a power actuated load supporting device capable of being brought to a substantially abrupt stop upon reaching a predetermined point in its extending or retracting movements.

It is a still further object of the present invention to provide a power actuated load supporting device with a manually operable means adapted to actuate the device to perform its function in case of failure of the power device.

In existing devices of the kind illustrated in the present invention the source of power such as a hand crank, motor or the like is remote from the relatively movable extending and retracting members thus requiring the use of levers, shafts or cables for connecting the source of power with the extending and retracting members. A load supporting device comprising a hand crank or motor, a plurality of levers, shafts and cables and the extending and retracting members makes for a heavy and cumbersome assembly which requires considerable space and necessitates substantial time for its installation. This is particularly undesirable and actually prohibitive when a device of this kind is to be installed in an airplane for purposes of raising and lowering the landing gear, for in an airplane weight is a most important factor and space is at a premium.

The present power actuated load supporting device is a light weight and compact structure, which, when used as a landing gear operating device, actually forms one of the struts of the landing gear assembly thereby requiring no multiplicity of shafts, levers or chains which add weight and increase assembling time both of which are appreciably reduced by the present device.

In addition to its lightness, compactness and sturdiness, other objects and advantages of the present invention will be apparent from the following description, reference being had to the accompanying drawings, wherein a preferred embodiment of the invention is clearly shown.

In the drawings:

Fig. 1 is a part sectional, part elevational view of the unitary, power driven load supporting device shown at reduced scale.

Fig. 2 is a full size, sectional view of the one (upper) portion of the device.

Fig. 3 is a full size sectional view of the other (lower) portion of the device.

Fig. 4 is a cross section taken along the line 4—4 of Fig. 3.

Fig. 5 is a detail, part sectional view of the sleeve-nut.

Figure 6:
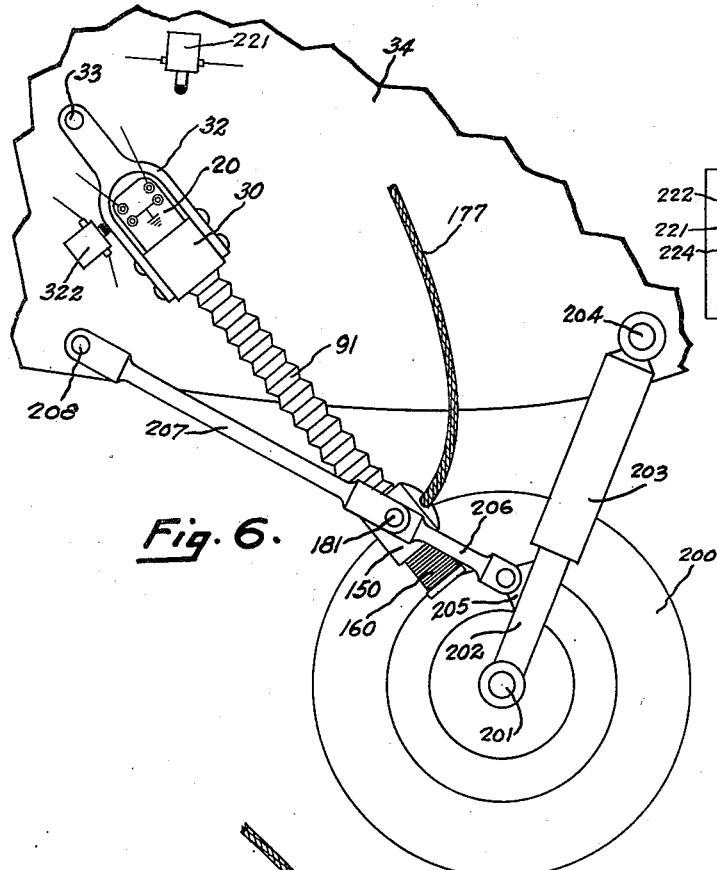
Fig. 6 is a schematic view of a lowered airplane landing gear equipped with the present invention.

Referring to the drawings, the numeral 20 designates the electric motor as a whole. The motor comprises a casing 21 and cover 22. Cover 22 supports a bearing 23 in which one end of shaft 24 of motor armature 25 is journalled. The other end of shaft 24 is journalled in a bearing 26 carried by the housing 30 which is recessed to receive and support one end of the motor casing 21. The numerals 27U and 27D designate the field windings of the electric motor 20 which are secured in the casing 21 in any suitable manner. The pole pieces of the electric motor are designated by the numerals 28. To simplify the drawings no brush construction cooperating with the commutator 29 of the armature 25 has been shown. Suffice to say that any standard brush mechanism can be used, said brush mechanism being carried by the cover 22 in any suitable manner.

Figure 7:
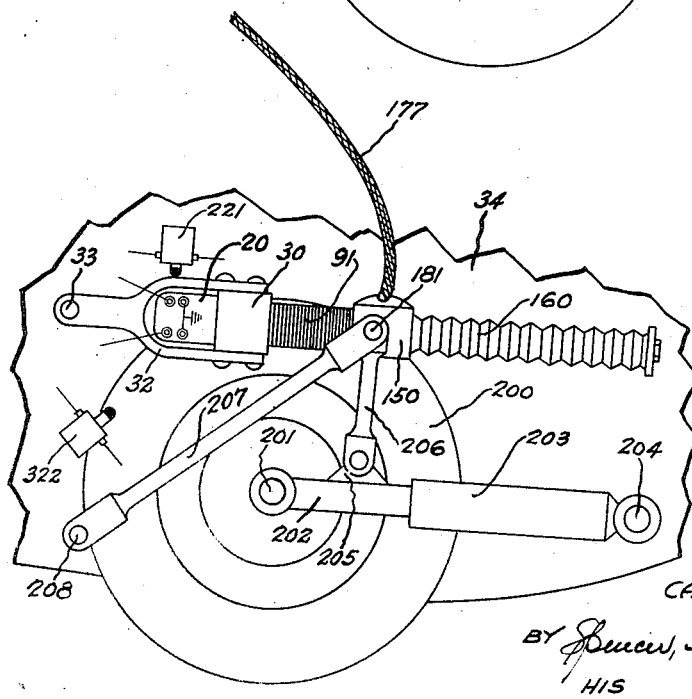
Fig. 7 is a view similar to Fig. 6, however, showing the landing gear in retracted position.

The housing 30, as shown in Fig. 1, has lugs on oppositely disposed sides thereof, said lugs each being bored out and threaded as at 31. These threaded lugs receive bolts for attaching the forked end of a mounting bracket 32 to the housing 31 as shown in Figs. 6 and 7. The mounting bracket 32 is hingedly secured on a stud 33 attached to the fuselage 34 of the airplane, only a fragment of the fuselage 34 being shown in Figs. 6 and 7.

Fig. 2 clearly illustrates the housing 30 and its contents. At the end of housing 30 adjacent the electric motor 20 an end wall 35 is centrally bored to house the bearing 26 which, as has been described, supports the armature shaft 24. This end of housing 30 is recessed to receive the end of the electric motor casing 21 which is secured to the housing by bolts 36 (Fig. 1). The other end of housing 30 is provided with a screw cap 37 locked in proper position on the housing by the finger 38 attached to housing 30 by bolt 39. The screw cap 39 has a central opening 40 through which extends the body portion 41 of the screw-shaft 42. An enlarged head portion 43 on screw-shaft 42 is rotatably supported within the housing 30 by two sets of roller bearings, one on each side of an annular flange 44 provided on the shaft head 43. The one set of roller bearings 45 are interposed between the flange 44 and an end thrust bearing ring 46 resting upon the end-cup 37 and the set of roller bearings 47 is interposed between flange 44 and an end thrust ring 48 fixedly positioned in the housing 30. This ring 48 has its inner periphery provided with gear teeth 49 forming an internal ring gear for the speed reduction gearing of the device.

The shaft head 43 is recessed as at 50 and in this recessed head there are provided internal gear teeth 51 forming another internal ring gear for the said reduction gearing. A counter bore in recess 50 houses the roller bearing 52 in which is supported one end 53 of the speed reduction gearing shaft so that this portion 53 of the shaft is concentric with the ring gears 49 and 51. A counter-balance weight member 54 is secured to shaft portion 53 adjacent bearing 52. The other end 55 of the gearing shaft is journalled in ball bearing 56 carried in a central recess provided in the cup-shaped partition member 57 which fits within the housing 30 and rests upon the end thrust ring 48 to hold it in position. A balance weight 58 is secured to this portion 55 of the gearing shaft. Between its portions 53 and 55 which are concentric, the gearing shaft has an eccentric portion 60 lying within the confines of the two internal ring gears 49 and 50. This eccentric portion 60 supports a double gear, the larger one of which is numbered 61 and its teeth mesh with the teeth of ring gear 49, the smaller one being designated by the numeral 62 and meshing with the teeth of the internal ring gear 51. Roller bearings 63 are interposed between the eccentric portion 60 of the gearing shaft and the double gear providing gears 61 and 62, so that this double gear is rotatable on the gearing shaft. The dimensions of cooperating gears 61—49 and 62—51 are predetermined to provide a selected speed reduction which may readily be altered by variations in the relative sizes of these cooperating gears.

The end of shaft portion 55 is centrally recessed as at 70 and flat portions 71 are provided in the peripheral surface adjacent this end. An armature disc 72 of magnetizable metal is centrally recessed to fit over and on the partially flattened end of shaft portion 55 so that disc 72 and shaft portion 55 must rotate together, however, disc 72 may slide longitudinally on said shaft portion 55. A cup-shaped spring retainer 74 has its open end attached to the armature disc 72 and extends into the recess 70 in shaft portion 55. A headed screw 75 is threadedly secured in the shaft portion 55 so that the screw passes concentrically into the spring retainer 74. A spring 76 is interposed between the bottom of the spring retainer 74 and the head of screw 75 and normally urges the armature disc 72 into gripping engagement with a brake ring 80 made of any suitable friction material and resting upon the outer surface of the partition member 57. A spacer collar 81 fits within the housing 30 and is interposed between the partition member 57 and a centrally apertured disc 83 which rests against the inner surface of the end wall of housing 30. Collar 81 is slightly counter-bored to fit over brake ring 80 and thus clamp and hold it against movement upon the partition member 57. The disc 83 has an inwardly extending annular flange 84 at and coaxial with its central opening in which the hub portion of a driving disc 85, secured to the shaft 24 of the motor armature 25, may rotate. A ring 86 in the spacer collar 81 supports a magnet winding 88 within the annular space defined by the collar 81, disc 83 and its annular flange portion 84 and ring 86. The space between the hub of driving disc 85 and flange portion 84 is such that a good magnetic field can be established by the energization of winding 88.

The inner face of the end ring 37 is counter-bored to receive the annular flange 90 on a flexible and collapsible sealing sleeve 91. A retainer ring 92 fits over the annular flange portion 90 of the sealing sleeve 91 being urged to hold said flange portion 90 in position in the recess of end ring 37 by the head portion 43 of the screw-shaft 42 which engages said retainer ring 92.

Figs. 3, 4 and 5 illustrate the lower end portion of the force transmitting device and the following description will have reference thereto.

The numeral 100 designates a helical groove provided in the screw-shaft 41. This groove is formed in the shaft from near its head portion 43 to the extreme outer end. A traveling nut in the form of a sleeve 101 fits comparatively loosely about the grooved shaft, said sleeve having a helical groove 102 provided in its inner peripheral surface, corresponding in size and pitch to the helical groove 100 in the outer peripheral surface of the shaft. An outwardly extending flange is formed at each end of the sleeve 101, the one flange being numbered 103, the other 104. Another outwardly extending flange 105 is formed on the sleeve intermediate its flanges 103 and 104. This intermediate flange 105 has spiral gear teeth 106 cut in its outer peripheral surface.

Two spaced apertures 107 and 108 are provided in the annular wall of the sleeve 101 between flanges 103 and 105 and two similar apertures 109 and 110 are provided in the sleeve 101 between flanges 104 and 105. All of these apertures are so arranged that they lead directly into and communicate with the helical groove 102 within the sleeve 101. A tube 111 is bent to conform substantially to the contour of the sleeve 101, one end of the tube extending into the aperture 107, the other end into the aperture 108, thereby providing outside and shunting communication between spaced portions of the helical channel formed by the contiguous and coinciding grooves 100 and 102 of the shaft 41 and sleeve 101 respectively. A similar tube 112, shown in section in Fig. 5, provides communication between apertures 109 and 110 in sleeve 101 and likewise forms an outside shunting passage which is in communication with the helical channel at spaced points. Tube 111 is secured to the sleeve 101 by a clip 113 screwed to the sleeve and a similar clip 114 attaches the tube 112 to the sleeve in a like manner. A series of balls 115 fills the tube 111 and that portion of the helical channel between sleeve apertures 107 and 108 and a series of similar balls 116 fills the tube 112 and the portion of the helical channel between apertures 109 and 110 in the sleeve 101. These balls mechanically connect the sleeve 101 to the shaft 41 so that rotation of either one relatively to the other will cause a relative longitudinal movement between said sleeve and shaft. The result is the same as having ordinary cooperating screw threads on the sleeve and shaft, however, by using the balls in the helical channel formed by the coinciding grooves in the sleeve and shaft, friction is reduced to a minimum and strength greatly increased.

The traveling nut or sleeve 101 is rotatably supported within a casing 150, the flanges 103 and 104 fitting into said casing so as to provide bearings for the sleeve as it rotates in the casing. An apertured bottom end wall 151 of the casing has an inner end thrust bearing ring 152 engaged by the flange 104 of the sleeve 101. A similar end thrust bearing 153 is engaged by the flange 103 of sleeve 101, this bearing 153 being held in engagement with said flange 103 by a centrally apertured screw cover 154 at the end of the casing 150. This screw cover 154 has an annular groove 155 which receives the annularly flanged end 156 of the flexible and collapsible sealing sleeve 91. A metal ring 157 in said flange 156 provides means for anchoring the sealing sleeve to the screw cover 154.

A sealing sleeve 160, similar to sleeve 91 is provided at the other end of casing 150. One end of this sleeve 160 is secured to casing 150 by a clamping ring 161 attached to the casing by screws 162. The other end of sealing sleeve 160 is anchored to a stud 163 secured in the end of the screw shaft 41.

As shown in Fig. 4, the casing 150 has an extension 170 in which two aligned bearings 171 and 172 are supported. In these bearings is journalled a shaft 174 providing a spiral pinion 175 which meshes with the spiral gear teeth 106 provided in the peripheral surface of the flange 105 on sleeve-nut 101. Shaft 174 is connected to any suitable hand operating device such as a crank or wheel (not shown) by a flexible drive 177 shown in the schematic views Figs. 6 and 7. Two diametrically opposite lugs 180 and 181 are provided on casing 150 and form means to which struts are secured. When installed, the casing 150 cannot rotate, but it may move lengthwise of the screw-shaft 41. Due to the non-rotatability of casing 150 in installation, sleeve-nut 101 will not rotate when screw-shaft 41 turns, for the engagement of spiral pinion 175 carried by the casing 150 with the spiral gear teeth 106 in the flange 105 of the sleeve-nut whereby said casing and sleeve-nut are locked together. However, when the spiral pinion is manually turned it will turn the sleeve-nut 101 relatively to the casing 150 and screw-shaft 41 and thus cause the sleeve-nut and casing to move lengthwise on the screw-shaft.

The Figs. 6 and 7 schematically show the present device installed in an airplane landing gear. The wheel of the landing gear is designated by the numeral 200. The spindle or axle 201 of said wheel is secured in the member 202 of the shock absorbing strut 203 which is hingedly attached to the stud 204 mounted on the fuselage 34 of the airplane. The member 202, which is the longitudinally movable part of the shock absorbing strut 203, has a protruding lug 205 to which is pivotally secured one end of a strut link 206, the other end of said link being hingedly secured to the lug 181 of the sleeve-nut casing 150. One end of a strut 207 is also hingedly secured to said lug 181, the other end of strut 207 being pivotally attached to the fuselage 34 by stud 208.

Reference to Fig. 6, which illustrates the landing gear lowered preparatory to the landing of the airplane, shows that during the landing, horizontal stresses are taken by the two aligned struts 206 and 207 and any vertical stresses are taken by the shock absorbing strut 203. No stresses of any appreciable degree are directed against the operating strut including the screw-shaft 41, sleeve nut 101, housing 30 and mounting bracket 32. The Fig. 7 illustrates the landing gear retracted and folded up into the fuselage 34.

Figure 8:
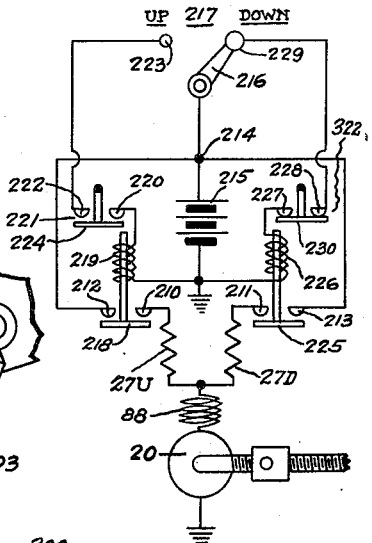
Fig. 8 is a wiring diagram showing the various electrical elements and their circuit connections.

The Fig. 8 shows the various electrical elements and their circuit connections. The motor 20 is grounded. It has two field windings 27U and 27D connected in series with the electromagnet winding 88. Field winding 27U is connected to a stationary contact 210 of a magnet switch, the other field winding 27D being connected to a stationary contact 211 of another magnet switch. The other stationary contacts 212 and 213 of the two magnet switches are connected together at the point 214 which is connected to one side of the storage battery or source of electrical power 215 and also to the operating contact arm 216 of a manwually operable selector switch 217. The storage battery is grounded on one side as shown.

Contacts 210 and 212 of the one magnet switch are adapted to be bridged by the movable contact 218 which is adapted to be moved into its bridging position by the energization of the magnet winding 219, one end of which is connected to the grounded side of the battery, the other end being connected to the one stationary contact 220 of the strut operated switch 221. The other stationary contact 222 of switch 221 is connected to the "up" contact 223 of the selector switch 217. The movable contact 224 of switch 221 is adapted to be actuated by the bracket 32 when the landing gear has reached a certain point in its retracting movement. Contacts 211 and 213 are adapted to be bridged by the movable contact 225 and when the magnet coil 226 is energized by the closing of switch 322. One end of coil 226 is connected to the grounded side of the battery, the other end to the stationary contact 227 of switch 322, the other stationary contact 228 of which is connected to the "down" contact 229 of selector switch 217, illustrated as engaged by the movable arm 216 of this switch. The movable bridging contact 230 of switch 322 is also adapted to be controlled by the bracket 32, being opened when the bracket is in its landing gear lowered position and closed when the landing gear is in its retracted or raised position.

During flight the landing gear of the airplane is in the position as shown in Fig. 7. When the pilot decides to land he moves the arm or movable contact 216 of the selector switch 217 into the "down" position as shown in Fig. 8. Now current from the battery 215 flows across movable contact 216 engaging "down" contact 229 of switch 217 to contact 228 of closed switch 322, then through contacts 230 and 227 of said switch, magnet winding 226 and back to the opposite side of the battery 215. This will cause energization of the magnet having winding 226 causing the movement of contact 225 to bridge contacts 211 and 213. This closes the circuit including battery 215, point 214, contacts 213, 225 and 211, motor field winding 27D, electromagnet winding 88 and through motor 20 back to the battery via ground, resulting in the energization of the electromagnet winding 88 which causes the armature disc 72 to be attracted and moved into driven engagement with the motor driving disc 85. It also causes the operation of the electric motor in one direction, specifically in the direction in which the screw-shaft 41, driven by the motor through the driving disc 85 and reduction gearing in housing 30, will cause the sleeve-nut 101, to move downwardly on said screw-shaft. As the sleeve-nut 101 moves downwardly along the screw-shaft 41 the casing 150 enclosing it will likewise move (to the right as regards Fig. 7) thus moving strut 207 about its pivot stud 208, causing a downward force to be exerted through link strut 206 and thereby lowering the wheel 200. When the landing gear reaches its lowered position the bracket 32 thereof will engage and open switch 322, breaking the circuit through the magnet winding 226 and by its consequent deenergization causing the disengagement of switch contacts 211 and 213 by contact 225. Now the motor circuit is broken and the motor ceases to operate and also the electro-magnet winding 88 is deenergized thereby permitting the spring 76 to move the armature disc 72 out of driven engagement with the motor driving disc 85 and into engagement with the braking ring 80. The frictional engagement of armature disc 72 with braking ring 80 quickly stops rotation of the speed reduction gearing connected to the screw shaft 41. As soon as the landing gear moves from its retracted position toward its lowered position the bracket 32 thereof will move away from switch 221 and permit its contact 224 to engage contacts 220 and 222 in anticipation to the landing gear raising or retracting cycle which is effective by the operation of the selector switch arm or contact 216 into engagement with the "up" contact 223. When this is done the electromagnet winding 219 is energized causing closure of contacts 210, 212 and 218 to energize the motor winding 27U and electromagnet winding 88 resulting in the operation of the electric motor in the opposite direction. This motor operation turns the screw-shaft 41 to move the sleeve-nut 101 upwardly drawing the casing 150 and its attached struts 206 and 207 toward housing 30 and finally pulling the wheel 200 from the position shown in Fig. 6 to the position shown in Fig. 7. As the landing gear so moves, switch 322 will be closed and switch 221 opened preparatory to the landing gear lowering operation.

Dust, dirt and moisture are prevented from reaching the operating parts and particularly the screw-shaft 41 of the device by the sealing sleeves 91 and 160 which are contracted and expanded as the casing 150 is moved back and forth along the said screw shaft.

If, for any reason there is a failure in the electrical system so that the motor cannot be used to actuate the screw-shaft or a failure in the driving connection so that the screw-shaft itself cannot be rotated, then manual means such as a crank or wheel, connected to a flexible driving member 177 may be used to turn the spiral pinion 175 which will rotate the sleeve-nut 101 relatively to the stationary screw-shaft 41 resulting in the necessary travel of said sleeve-nut and its casing 150 along the screw-shaft 41.

From the aforegoing description it is shown that the present invention provides a light, sturdy and compact, unitary load supporting device driven by an electric motor. The device is so designed that the electric motor or power source forms a part of the unitary assembly and actually moves therewith. This facilitates and reduces time for installation and also eliminates the necessity of numerous and sometimes long rods, levers or chains necessary for transmitting movement where the power or moving source is remote from the member to be actuated.

While the embodiment of the present invention as herein disclosed, constitutes a preferred form, it is to be understood that other forms might be adopted, all coming within the scope of the claims which follow.

What is claimed is as follows:

1. In combination with a main body having a load movably attached thereto, of an extensible and retractible load moving device comprising, a screw having a nut threaded thereon; a member attaching the nut to the load; an electric motor for rotating the screw; means securing the electric motor to the main body; means for preventing rotation of the nut while the screw is being rotated by the electric motor; means for rotating the nut; and means for preventing rotation of the screw while the nut is being rotated.

2. In combination with a main body, of a load movably supported thereby, an extensible and retractible load moving device comprising, a screw having a nut threaded thereon; means for attaching the nut to the load; an electric motor operatively connected to the screw for rotating it; means for attaching the electric motor to the main body; means for locking the nut against rotation while the screw is being rotated by the electric motor, said means being manually operable to rotate the nut on the screw; and means for locking the screw against rotation when the nut is being manually rotated.

3. In combination with a main body, of a load suspended therefrom, an extensible and retractible load moving device interposed between the body and load comprising, a screw having a nut threaded thereon; a trunnion securing the nut to the load; an electric motor pivotally attached to the main body and operatively connectible to the screw for rotating it; means for connecting the electric motor with the screw when said motor is energized; means operatively engaging the nut to hold it against rotation while the screw is being rotated by the electric motor; manually operable mechanism for rotating said last mentioned means to turn the nut on the screw; and means for locking the screw against rotation while the nut is being rotated.

4. In combination with two relatively movable elements, one a body, the other a load movably secured to said body, an extensible and retractible load moving device comprising, a screw having a nut threaded thereon; means anchoring the nut to one of said elements; an electric motor anchored to the other of said elements and operatively connectable to the screw for rotating it; means connecting the motor with the screw; means operatively engaging the nut to lock it against rotation while the screw is being rotated by the motor; manually operable mechanism connected to the last mentioned means for rotating it to turn the nut on the screw; and means for locking the screw against rotation while the nut is being operated manually.

5. In combination with a body; of a load movably attached thereto; an extensible and retractible load moving device comprising, a screw; a nut threadedly mounted upon said screw, said nut having gear teeth provided about its outer periphery; a trunnion for securing the nut to the load; an electric motor for rotating the screw; means pivotally securing the electric motor to the body; a pinion rotatably carried by the trunnion and meshing with the gear teeth on the nut, said pinion locking the nut against rotation when the screw is rotated by the motor; means for rotating the pinion to turn the nut on the screw; and means for locking the screw against rotation while the nut is being turned by the pinion.

6. In combination with a body; of a load movably attached thereto; an extensible and retractible load supporting device comprising, a screw; a nut threadedly mounted upon said screw, said nut having gear teeth provided about its outer periphery; a housing attached to the body and rotatably supporting the screw; a second housing attached to the load and rotatably supporting the nut; an electric motor carried by the first housing for rotating the screw; means rotatably supported in the second housing and operatively connected to the nut for locking it against rotation while the screw is being rotated by the motor; means for rotating the first mentioned means to turn the nut relatively to the screw; and means for holding the screw against rotation while the motor is inoperative.

7. In combination with a main body; a load movably attached to said body; an extensible and retractible load moving device comprising, a screw; a nut threaded thereon; separate housings rotatably supporting the screw and the nut respectively; means pivotally attaching said housing to the body and the load respectively; an electric motor on the housing of the screw; a braking member secured in the housing of the screw; a disc operatively connected to the screw, normally engaging the braking member to prevent rotation of the screw; means, rendered effective when the electric motor is rendered operative, for moving and disconnecting the disc from the brake and operatively connecting said disc with the electric motor; means in the housing containing the nut, operatively engaging the nut to lock it against rotation when the screw is being operated by the motor; and manually operable means for turning said locking means to rotate the nut relatively to the screw when the motor is inoperative.

8. In a device of the character described the combination with a body; of a load movably secured to the body; an extensible and retractible load moving device comprising, a pair of housings each one of which is adapted to be secured to the body, the other to the load; a screw extending from and rotatably supported by one of said housings; a nut on the screw, rotatably carried by the second of said housings; an electric motor on the said one housing for driving the screw; means in the said second housing, engaging the nut to lock it against rotation while the motor is driving the screw, said means being rotatable in its housing to turn the nut relatively to the screw; and means in the said one housing for holding the screw against rotation while the electric motor is inoperative.

9. In a device of the character described, the combination with a main body; of a load movably supported thereby; an extensible and retractible load moving device comprising, a pair of housings one of which is pivotally secured to the main body, the other being pivotally anchored to the load; a screw rotatably supported by and extending from one of said housings; a nut threadedly engaging the screw and rotatably supported in the second housing, said nut having an outer, annular flange providing a gear; an electric motor on the first housing adapted, only when energized, to be connected to the screw for driving it; an electromagnet clutch for connecting the motor with the screw; a pinion carried in the second housing and meshing with the gear on the nut, said pinion normally holding the nut locked to the housing but adapted to be rotated relatively to the housing to turn the nut on the screw; means for rotating the pinion; and means in the first housing engaged by a portion of the electromagnetic clutch for holding the screw against rotation when said clutch is deenergized and the screw is disconnected from the motor.

10. In a device of the character described, the combination with a main body; a load movably secured thereto; an extensible and retractible load moving device comprising, two separate housings one of which is pivotally attached to the body, the other to the load; a screw shaft rotatably supported by and extending from the one of said housings; a nut rotatably supported in the second housing and threadedly secured on the screw shaft; an electric motor on the first housing, connecting means in said first housing operatively connected to the screw shaft and rendered effective for connecting the electric motor with the screw shaft to rotate it only when the motor is energized, means in said first housing, engaged by the connecting means, for locking said screw shaft against rotation when said connecting means is disconnected from the motor; means in the second housing for locking the nut against rotation, said means being manually operable to rotate the nut relatively to the said second housing and the screw shaft for effecting movement of the nut longitudinally of the screw shaft.

11. In a device of the character described, the combination with a body; of a load movably attached thereto; an extensible and retractible load moving device interposed between the body and the load and comprising, two separate housings one of which is pivotally attached to the body, the other to the load; a screw shaft rotatably supported by and extending from the first of said housings; a nut rotatably supported in the second housing and threadedly secured on the screw shaft; an electric motor on the first housing, electromagnetic means in said first housing said means having a member rendered effective for connecting the electric motor with the screw shaft only when the motor is energized, braking means in said first housing, engaged by the said member of the electromagnetic means, for locking said screw shaft against rotation when said member is disconnected from the motor; an outer, annular flange on the nut, providing a gear on said nut; a pinion rotatably supported in the second housing and meshing with the gear on the nut, said pinion locking the nut against rotation with the screw shaft; and means for rotating the pinion to turn the nut relatively to the screw shaft and the second housing.

12. In a device of the character described, the combination with a main body; of a load movably secured thereto; an extensible and retractible load moving device comprising, two housings adapted to be attached to the load and body respectively; a screw shaft rotatably carried by and extending from the one of said housings; an electric motor carried by said one housing; a brake element carried in said one housing, normally holding the screw shaft against rotation; means responsive to the energization of the electric motor for connecting the motor with the screw shaft to drive it; a nut in the other of said housings, threadedly mounted on the screw shaft and having an exterior gear formed on its outer peripheral surface; a pinion rotatably mounted in the said other housing and meshing with the gear on the nut to hold the nut against rotation when the screw shaft is driven by the motor; and means for rotating the pinion to turn the nut relatively to the screw shaft.

13. In a device of the character described, the combination with a main body; of a load movably attached thereto; a load moving device connected between the body and load, said device comprising an electric motor, a screw shaft, a traveling nut on said screw shaft; means interposed between the motor and screw shaft for locking the screw shaft against rotation when the motor is inoperative and adapted to be energized concurrently with the electric motor to release the screw shaft lock and operatively connect it to the electric motor so that it may be rotated thereby; and a common means for holding the nut against rotation while the motor is operating and for rotating the nut relatively to the screw shaft when said shaft is locked against rotation.

14. In a device of the character described, the combination with a main body; a load movably supported thereby; an expansible and retractible load moving device comprising two housings, one of which is pivotally secured to the main body, the other to the load; an electric motor in the said one housing; a screw shaft rotatably supported by and extending from said one housing; a nut rotatably supported in said other housing, said nut threadedly receiving the screw shaft; speed reducing gearing in said one housing and connected to the screw shaft; a braking member in said one housing; a magnetic member operatively connected to the speed reducing gearing and yieldably urged into frictional engagement with the braking member; a magnetic driving disc secured to the motor so as to be rotated thereby; a magnet winding for energizing said driving disc to attract the magnetic member, to move it out of engagement with the braking member and into engagement with the driving disc; a worm gear in the said other housing, operatively engaging the nut to hold it against rotation while the screw shaft is being rotated, said worm gear being adapted to rotate the nut relatively to the screw shaft while the motor is inoperative and the magnetic member frictionally engages the braking member.

CALVIN J. WERNER.